(12) United States Patent
Mikolajek et al.

(10) Patent No.: US 10,900,589 B2
(45) Date of Patent: Jan. 26, 2021

(54) VALVE

(71) Applicant: Continental Automotive GmbH, Hannover (DE)

(72) Inventors: Carsten Mikolajek, Griesheim (DE); Christian Weis, Budenheim (DE)

(73) Assignee: Vitesco Technologies GmbH, Hannover (DE)

( * ) Notice: Subject to any disclaimer, the term of this patent is extended or adjusted under 35 U.S.C. 154(b) by 312 days.

(21) Appl. No.: 15/780,775

(22) PCT Filed: Dec. 5, 2016

(86) PCT No.: PCT/EP2016/079773
§ 371 (c)(1),
(2) Date: Jun. 1, 2018

(87) PCT Pub. No.: WO2017/097713
PCT Pub. Date: Jun. 15, 2017

(65) Prior Publication Data
US 2020/0248835 A1 Aug. 6, 2020

(30) Foreign Application Priority Data
Dec. 7, 2015 (DE) .................. 10 2015 224 467

(51) Int. Cl.
*F16K 31/53* (2006.01)
*F02M 26/54* (2016.01)
*F02M 26/67* (2016.01)
*F16K 31/04* (2006.01)

(52) U.S. Cl.
CPC ............. *F16K 31/53* (2013.01); *F02M 26/54* (2016.02); *F02M 26/67* (2016.02); *F16K 31/047* (2013.01)

(58) Field of Classification Search
CPC ........ F02M 26/54; F02M 26/67; F16K 31/53; F16K 31/047
See application file for complete search history.

(56) References Cited

U.S. PATENT DOCUMENTS

| 7,032,877 | B2 | 4/2006 | Von Willich |
| 8,171,919 | B2 * | 5/2012 | Klipfel .................. F02M 26/50 123/188.1 |
| 8,490,605 | B2 | 7/2013 | Gracner et al. |

(Continued)

FOREIGN PATENT DOCUMENTS

| CN | 103016215 | 4/2013 |
| CN | 104110330 | 10/2014 |

(Continued)

*Primary Examiner* — Eric Keasel
(74) *Attorney, Agent, or Firm* — Cozen O'Connor

(57) ABSTRACT

A valve for opening up or closing off a flow path includes: a valve disk; a valve tappet having: a central axis, a first end region adjacent to the valve disk, and a second end region facing away from the valve disk; and a transmission device configured to transmit a rotational movement into a translational movement. The transmission device includes: a toothed segment, and a rocker lever mounted so as to be rotatable, about a rocker lever axis of rotation, by a drive plate via the toothed segment. The rocker lever is connected to the valve tappet by pushrods, the pushrods being mounted rotatably in relation to the rocker lever and the valve tappet.

10 Claims, 3 Drawing Sheets

(56) References Cited

U.S. PATENT DOCUMENTS

| | | |
|---|---|---|
| 9,188,088 B2 | 11/2015 | Eggler et al. |
| 2010/0176325 A1 | 7/2010 | Klipfel et al. |
| 2010/0319663 A1 | 12/2010 | Gracner et al. |
| 2011/0291036 A1 | 12/2011 | Yamanaka et al. |
| 2013/0139503 A1 | 6/2013 | Eggler et al. |

FOREIGN PATENT DOCUMENTS

| | | |
|---|---|---|
| CN | 104455678 | 3/2015 |
| CN | 104500831 | 4/2015 |
| DE | 10327868 | 1/2005 |
| DE | 10 2007 054 769 A1 | 5/2009 |
| DE | 10 2010 022 736 A1 | 12/2011 |
| DE | 10 2011 075528 A1 | 12/2011 |
| DE | 10 2011 004018 A1 | 8/2012 |
| EP | 1882843 A2 | 1/2008 |
| EP | 2 172 682 A1 | 4/2010 |

\* cited by examiner

VALVE

CROSS-REFERENCE TO RELATED APPLICATIONS

This is a U.S. national stage of application No. PCT/EP2016/079773, filed on 5 Dec. 2016, which claims priority to the Germany Application No. 10 2015 224 467.9 filed 7 Dec. 2015, the content of both incorporated herein by reference.

BACKGROUND OF THE INVENTION

1. Field of the Invention

The invention relates to a valve for opening up or closing off a flow path.

2. Related Art

In numerous application areas, rotational movements of a drive motor are transmitted into a linear or into a translational movement for the purpose of actuating a valve. This principle is also applied, for example, in valves for controlling exhaust gas recirculation in motor vehicles. For this purpose, use is often made of a gear transmission that converts the rotational movement into a linear or translational movement by way of a corresponding kinematic mechanism. The conversion of the rotational movement may be realized, for example, via a crank drive or a slotted link gear mechanism. For this purpose, a wide variety of structural designs are known in the prior art.

A disadvantage of devices of this type is, in particular, that, during the conversion of the movement, unwanted transverse forces are generated, which can be transmitted to the valve tappet or to the valve disk. This leads to greater wear and to a reduced lifetime. Also, jamming of the valve can occur.

It is furthermore a disadvantage that in particular slots in slotted link gear mechanisms have to be produced with a very high production accuracy in order for the play at the valve disk and the valve tappet to be kept as small as possible. It is also a disadvantage that, owing to installation space requirements and the structural design of crank drives or slotted link drives, it is often the case that only one-sided mounting of the valve tappet is provided, which can result in particular in tilting or jamming of the valve tappet.

SUMMARY OF THE INVENTION

In view of the problems of the prior art, it is an object of the present invention to provide a valve having an optimized structural form regarding the susceptibility to tilting of the valve tappet, and furthermore exhibiting improved conversion/transmission of the rotational movement of a drive motor into a translational movement of the valve tappet.

This object may be achieved, according to one aspect of the present invention by a valve for opening up or closing off a flow path, with a valve disk, with a valve tappet, and with a transmission device for converting a rotational movement into a translational movement, wherein the transmission device is formed by a rocker lever mounted so as to be rotatable about, an axis of rotation and which is able to be rotated about the axis of rotation by a drive plate via a toothed segment, wherein the rocker lever is connected to the valve tappet by of pushrods, wherein the pushrods are mounted rotatably in relation to the rocker lever and the valve tappet.

Use is advantageously made of a drive motor, for example an electric motor, to move the valve. The rotational movement of the drive motor is transmitted to one or more drive plates, this resulting, for example in transmission of the drive force also being achieved. To convert the rotational movement into a translational movement, a transmission device is provided. This is formed particularly advantageously by a rocker lever mounted so as to be rotatable about an axis of rotation. The mounting may advantageously occur in structures arranged around the valve.

The rotation of the rocker lever about its own axis of rotation is preferably transmitted to the valve tappet by pushrods, the tappet, for its part, being connected to the valve disk. The valve disk may also be formed integrally with the valve tappet and correspondingly moves along with the valve tappet.

The pushrods transmit force from the rocker lever to the valve tappet. Owing to the in-principle fixed-position mounting of the rocker lever and to displaceability of the valve tappet relative to the mounting of the rocker lever, it is possible for a movement path for the valve tappet or the valve disk to be achieved that is sufficient for the opening up or closing off of a flow path.

The rocker lever forms, together with the pushrods, a knee lever joint, wherein the maximum displacement travel of the valve tappet is defined by the spacing of the axis of rotation to the mountings of the pushrods at the rocker lever.

It is particularly advantageous for the valve tappet to be preloaded, by a preload device, counter to the translational movement that is able to be generated by the rocker lever. The preload device may be formed, for example, by a spring. In the simplest case, a spiral spring is provided, wherein the valve tappet is guided through the spiral spring along the central axis of the spiral spring, which in particular allows a uniform introduction of force into the valve tappet to be achieved. Moreover, the transverse forces caused by the spiral spring are, in this case, minimal.

A preferred exemplary embodiment is characterized in that the pushrods are arranged radially offset from the central axis of the valve tappet, wherein the pushrods are arranged parallel to the central axis.

Parallel guidance of the pushrods makes it possible to minimize or completely prevent the generation of transverse forces, or torques acting around the valve tappet. An arrangement of two pushrods, which are each arranged so as to be radially spaced apart from the valve tappet, can in particular avoid tilting or jamming of the valve tappet since an introduction of force on both sides counteracts this.

It is also preferable if the valve tappet has two radial bearings, wherein one radial bearing is arranged at that end region of the valve tappet adjacent to the valve disk and the other radial bearing is arranged at that end region of the valve tappet facing away from the valve disk. Mounting of the valve tappet on two radial bearings that are far apart from one another along the main direction of extent of the valve tappet is advantageous for achieving guidance of the valve tappet which is as accurate as possible. When two independent radial bearings are used, it is possible for these to be correspondingly formed with a shorter axial extent.

In an alternative embodiment, mounting by only one radial bearing may also be provided. However, in this case, it is particularly preferred if the axial extent of the radial bearing is significantly greater than when two independent radial bearings are used. In order to ensure sufficiently accurate guidance, that region of the valve tappet that is guided by the radial bearing has to be lengthened significantly.

It is also advantageous if the toothed segment has an inner toothing and the drive plate engages into the inner toothing, wherein, by rotating the rotatably mounted drive plate, the rocker lever is rotatable about its axis of rotation.

The toothed segment is part of the rocker lever and serves in particular to transmit the rotational movement of a drive plate to the rocker lever or the pushrods. The toothed segment is preferably formed by a subsegment of a circular disk which has an inner toothing in a cutout. In this case, a disk is characterized in particular by having a significantly greater extent in the radial direction than in the axial direction. A subsegment other than that of a circular disk may also be used according to an aspect of the invention. A drive plate preferably has an outer toothing that engages into the inner toothing. This may be realized, for example, via a toothing on the outer circumference of the drive plate. It may also be provided that the drive plate has an axially protruding projection having corresponding toothed elements. The axially protruding projection extends in the circumferential direction of the drive plate preferably only over a limited, predefinable angle range, wherein the size of the angle range in the circumferential direction is determined in dependence on the maximum required adjustment travel of the valve.

Since it is generally the case that the movement in the translational direction is limited to a narrowly defined working travel, normally a few millimeters to a few centimeters, a toothing between the drive plate and the toothed segment over an angle range in the circumferential direction of less than 90 degrees is generally sufficient. This is particularly advantageous since the individual elements may consequently be formed in a more space-saving manner, as a result of which the valve may have a more compact structural form overall.

Alternatively, it is also possible for a toothed wheel with an outer toothing to be provided, which toothed wheel is also rotatable about the axis of rotation of the drive plate and is fixedly connected to the drive plate. Different sizing of the toothed wheel and the drive plate also makes it possible for an additional gear transmission for changing the rotational speed or the transmitted torques to be realized.

It is furthermore advantageous if the valve tappet has a disk-shaped receiving device for receiving the preload device, the receiving device extending from the valve tappet in the radial direction, wherein the receiving device has undercuts for guiding through the pushrods. Such a disk-like formation allows the preload device, which is preferably a spiral spring, to be received in a simple manner, wherein in particular the introduction of force can be realized particularly uniformly and in a manner relatively free of transverse forces. In order to ensure sufficient free space for the pushrods, the disk-shaped receiving device preferably has undercuts. This significantly increases the maximum angle that a pushrod can assume in relation to the central axis of the valve tappet, and thus also the maximum displacement travel of the valve tappet.

It is also expedient if the pushrods have, on both sides at their end regions, in each case, one through bore, wherein the through bores extend parallel to the axis of rotation of the rocker lever, and axis elements, which are likewise oriented parallel to the axis of rotation of the rocker lever, are guided through the through bores, wherein the pushrods are rotatable around the respective axis elements and the axis elements are connected rotationally conjointly to the valve tappet or the rocker lever.

This is advantageous for mounting the pushrods rotatably both in relation to the rocker lever and in relation to the valve tappet. In this way, sufficient mobility can be generated to be able to advantageously transmit the movement of the rocker lever to the valve tappet. The function of a knee lever joint can be realized only by rotatable mounting of the pushrods.

It is additionally advantageous if the rocker lever has two attachment regions for attaching, in each case, one pushrod, wherein the rocker lever has a cutout through which the valve tappet extends, wherein the attachment regions are arranged on the right and left of the valve tappet in the radial direction. This allows a structure to be achieved in which the valve tappet is guided centrally through the rocker lever, and the pushrods are arranged, in each case, on the right and left. This allows a particularly uniform transmission of force from the rocker lever to the valve tappet to be achieved.

It is furthermore expedient if the rocker lever and/or the toothed segment and/or the drive plate and/or the pushrods and/or the valve tappet are produced from a plastic. Owing to the optimized design of the valve, it is possible for a particularly optimized transmission of force to be achieved, which is characterized in particular by small transverse forces and disruptive torques. Consequently, the individual elements may have smaller dimensions or be produced from less robust materials without at the same time compromising the function of the valve and the durability. It is possible, in particular through the use of plastic, for a significantly lighter valve to be produced, which additionally offers improved thermal insulation and is likewise advantageous regarding the generation of disruptive noises.

It is also advantageous if the valve is able to be closed by the preload device when current is not being applied. This is advantageous since, in this way, in the case of a defect of the control device or of some other reason for failure of the drive motor, the valve is closed by the preload device in any case. Inadvertent opening or leaving open of the valve is thus effectively avoided in a simple manner. It is also possible to avoid damage as a result of a valve element, in particular the valve disk, undesirably projecting into the flow path.

Advantageous refinements of the present invention are described in the following description and the figures.

BRIEF DESCRIPTION OF THE DRAWINGS

The invention will be discussed in detail below on the basis of exemplary embodiments and with reference to the drawings, in which.

DETAILED DESCRIPTION OF THE PRESENTLY PREFERRED EMBODIMENTS

Figure 1:
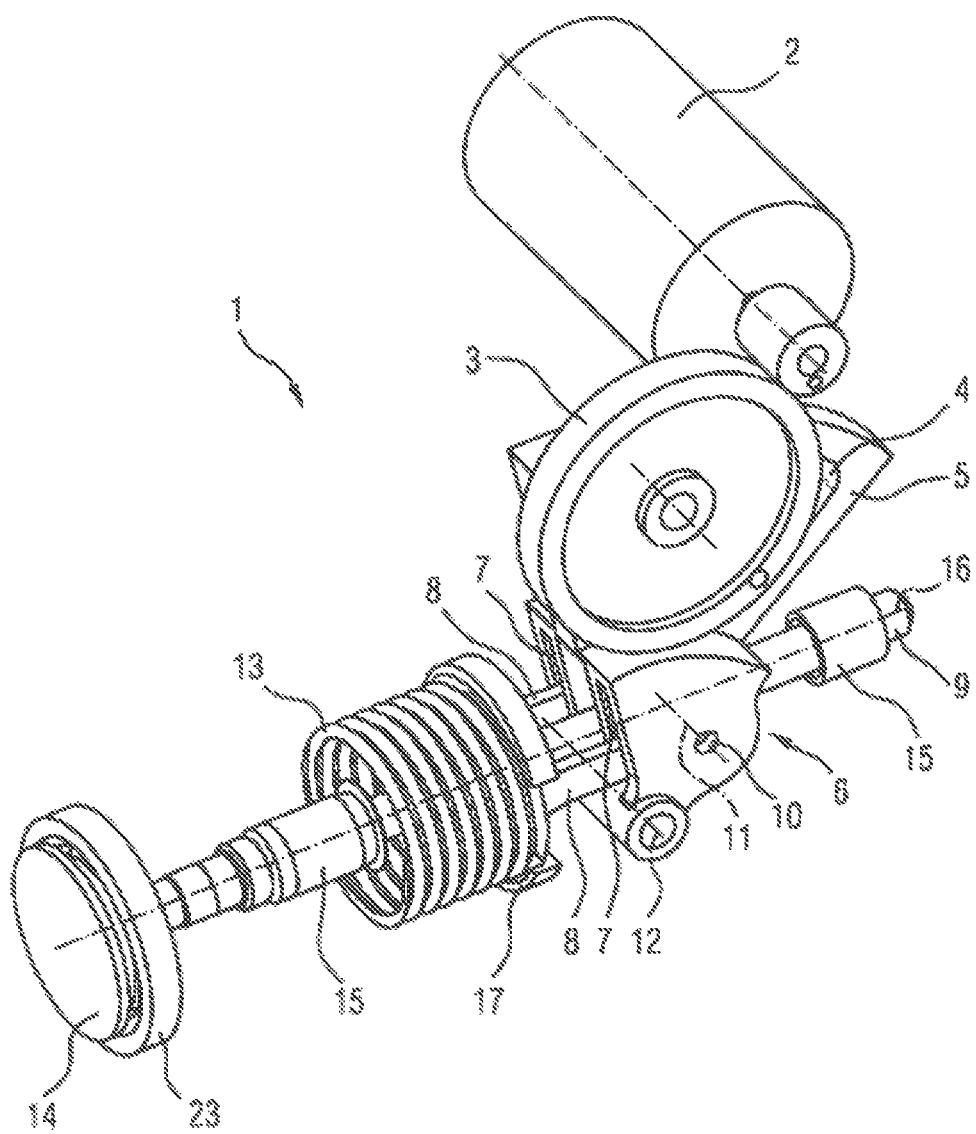
FIG. 1 shows a perspective view of a valve according to an aspect of the invention with an electric motor, with a drive plate, with the rocker lever, with the pushrods, with the preload device, with the valve tappet, and with the valve disk.

FIG. 1 shows a valve 1 with an electric motor 2 whose output shaft drives the drive wheel 3, Arranged on the rearwardly directed side of the drive wheel 3 is a toothed wheel with an outer toothing. The toothed wheel (not shown) engages into the cutout 4 of the toothed segment 5 which is part of the entire rocker lever 6.

The cutout 4 has an inner toothing into which the outer toothing of the toothed wheel (not shown) engages. This interaction of the outer toothing and the inner toothing allows the rotational movement to be transmitted from the drive wheel 3 to the toothed segment 5 or to the rocker lever 6. The toothed segment 5 is formed as a subportion of a circular, disk-like element and, in the lower region, opens into the attachment regions 7 of the rocker lever 6. The attachment regions 7 each serve for attaching a pushrod 8, which connects the rocker lever 6 to the valve tappet 9. The pushrods 8 are mounted rotatably in the attachment regions 7, which are formed substantially by U-shaped limbs, along an axis 11 extending through the opening 10. The U-shaped limbs of the attachment regions 7 are arranged parallel to one another on the left and right of the central axis 16 of the valve tappet 3. The axis 11 is arranged parallel to the axis of rotation 12 of the rocker lever 6. Furthermore, the axes of rotation of the drive motor 2 and of the drive plate 3 are also arranged parallel to the axis of rotation 12 of the rocker lever 6.

Figure 2:
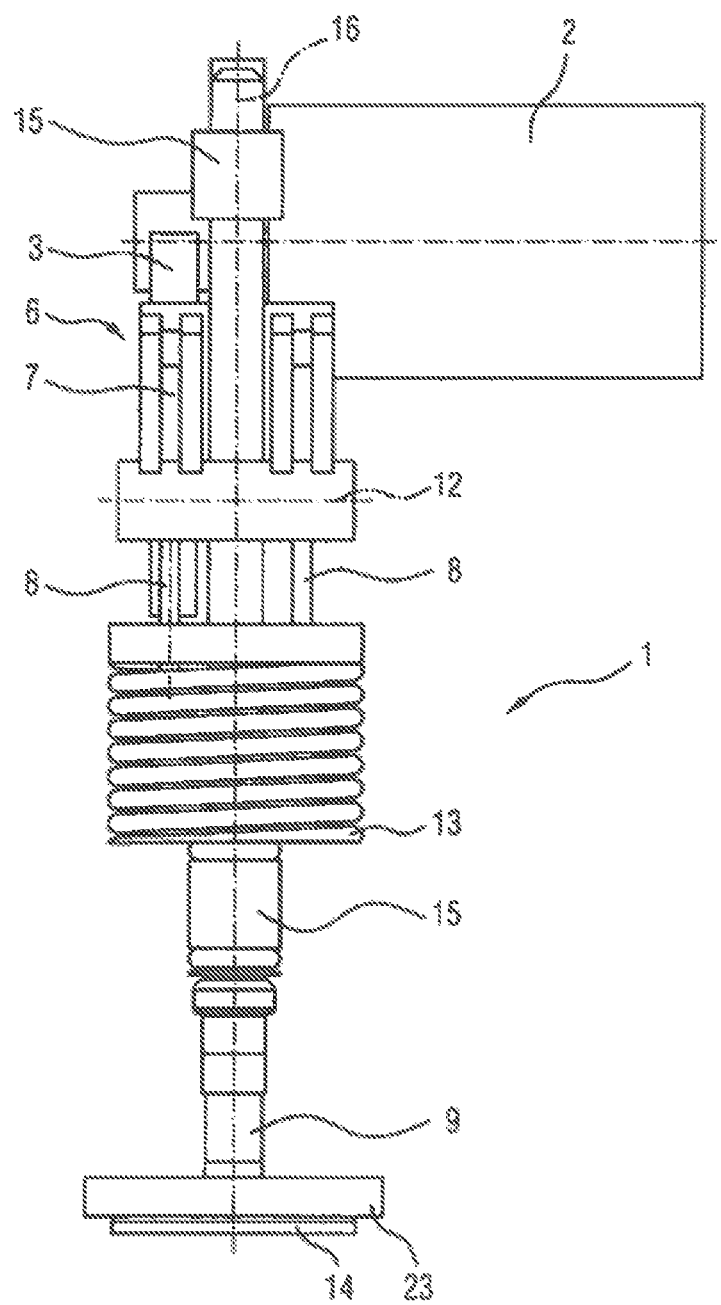
FIG. 2 shows a plan view of the valve according to FIG. 1.
Figure 3:
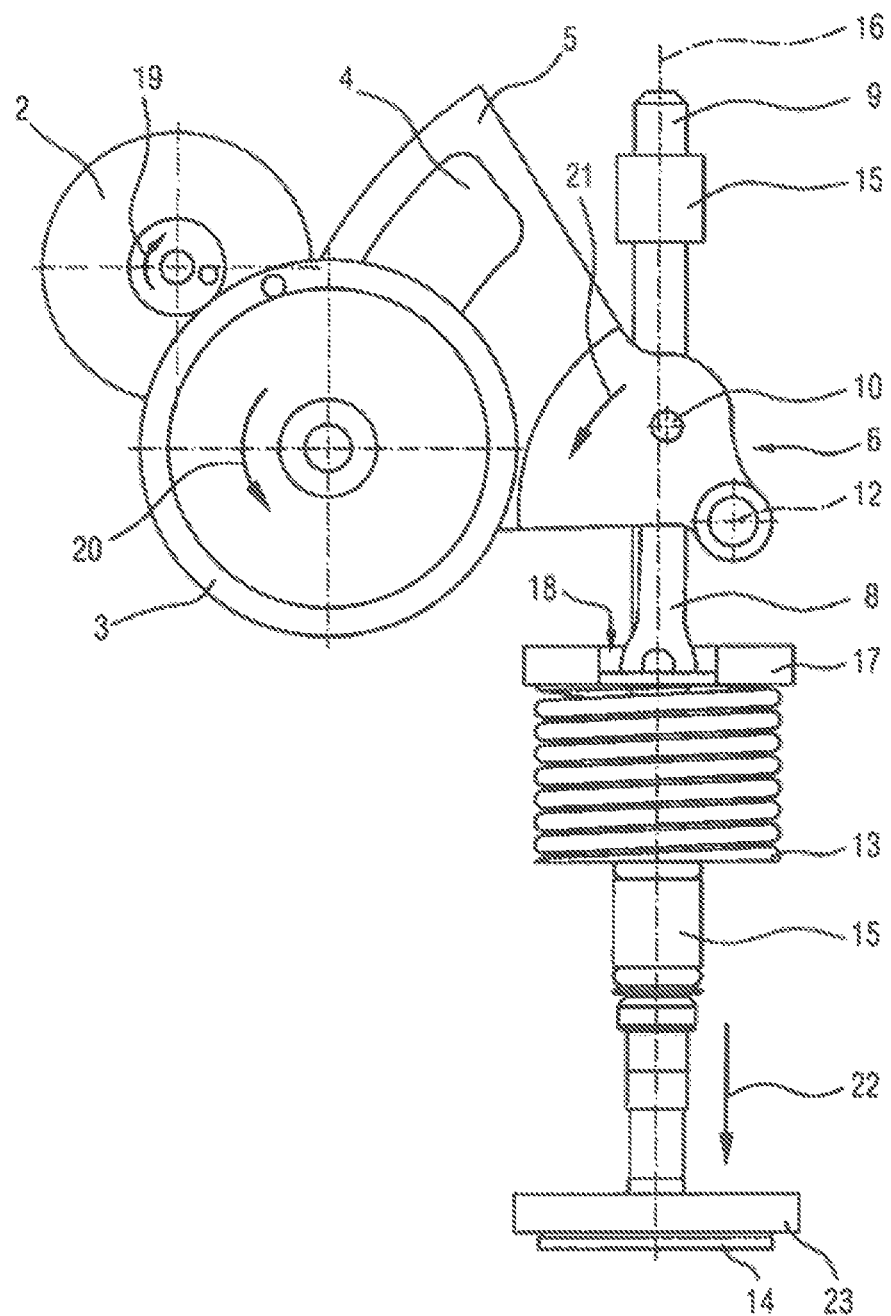
FIG. 3 shows a side view of the valve already shown in FIGS. 1 and 2.

The valve tappet 9 is formed substantially by a rotationally symmetrical element and extends centrally through the rocker lever 6 and the spiral spring 13 which acts as a preload device. At the left end region of the valve tappet 9 is arranged a valve disk 14 which serves for closing off and opening up a flow path (not shown in FIG. 1). For this purpose, the valve disk 14 can be pushed into a valve seat 23, or pulled out of the seat. In FIGS. 1 to 3, the valve seat 23 is indicated in each case by a ring, which may be, for example, part of a housing. The valve tappet 9 is mounted by way of two radial bearings 15, which are arranged at the two end regions of the valve tappet 9 and permit guided movement along the central axis 16 of the valve tappet 9.

The spiral spring 13 is supported in relation to a structure (not shown) and in relation to the valve tappet via the disk-shaped receiving device 17. The spiral spring acts counter to the movement to the left of the valve tappet, and thereby keeps the valve closed in a deenergized state of the drive motor 2.

The rocker lever 6 forms, together with the pushrods 8, a knee lever joint. The pushrods 8 are mounted rotatably in relation to radially protruding axis portions of the valve tappet 3 (which are not shown). The axis portions 11 likewise extend parallel to the axis of rotation 12 of the rocker lever 6. Furthermore, the pushrods 8 are, in relation to the rocker lever 6, mounted rotatably in the attachment regions 7. The axis extending through the opening 10 and at which the pushrods 8 are mounted rotatably in the attachment region 7 likewise extends parallel to the axis of rotation 8. As a result of the respective axes being directed in a parallel manner, the rocker lever 6 can be moved with transverse forces at the valve tappet 9 being generated only to a very small extent.

At the valve 1 according to FIG. 1, it is particularly advantageous that a transmission of force is realized by way of the inner toothing between the toothed segment 5 of the rocker lever 6 and the drive plate 3, which transmission of force functions particularly free of transverse forces since the inner toothing is positioned in a plans with the central axis 16 of the valve tappet 9 and in the central plane of the rocker lever 6. Owing to the structure, as shown in FIG. 1, it is also in particular the case that the tilting of the rocker lever 6 in relation to the valve tappet 9 and the drive wheel 3 is minimized in that the introduction of force or the transmission of force is positioned in a common plane.

FIG. 2 shows a plan view of the valve 1 in FIG. 1. For identical elements, the same reference signs have accordingly been used.

In FIG. 2, it can be seen in particular that the valve tappet 9 is guided exactly centrally through the rocker lever 6, and so the attachment regions 7 are arranged on the right and left of the valve tappet S at an equal spacing. It can also be seen that the pushrods 8 are oriented exactly parallel to the central axis 16 of the valve tappet 9, this further preventing the generation of transverse forces.

In the view of FIG. 2, the inner toothing is positioned directly behind the valve tappet 9 and is thus covered by the valve tappet 9.

It is furthermore illustrated in FIG. 2 that the valve tappet 9 is oriented along the central axis of the spiral spring 13 in order also not to generate additional transverse forces in the transmission of force from the spiral spring 13 to the valve tappet 9. Additionally, FIG. 2 clearly shows that all the axes of rotation are arranged parallel to one another, this likewise giving rise to a relatively uniform introduction of force into the individual elements.

FIG. 3 shows a side view of the valve 1 in FIGS. 1 and 2. In FIG. 3 too, for identical elements, the same reference signs are accordingly used.

In FIG. 3, it is additionally shown that the receiving device 17, in relation to which the spiral spring 13 is supported, has undercuts 18 through which the pushrods 8 are guided. The undercuts 18 serve in particular for creating sufficient freedom of movement for the pushrods 8 to allow the complete function of the knee lever joint and to realize a sufficiently large adjustment travel of the valve disk 14.

In FIG. 3, the direction of movement of the individual rotating elements 2, 3 and 6 and the valve tappet 9 is additionally illustrated by the arrows 19, 20, 21 and 22.

The exemplary embodiments in FIGS. 1 to 3 are in particular not of a limiting nature, and serve for illustrating the concept of the invention. In particular differing structural designs of the individual elements, which are possible in many different ways, are included in the concept of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A valve (1) for opening up or closing off a flow path, the valve (1) comprising:
a valve disk (14);
a valve tappet (9) having: a central axis (16), a first end region adjacent to the valve disk (14), and a second end region facing away from the valve disk (14); and a transmission device (5, 6) configured to convert a rotational movement into a translational movement, the transmission device (6) including:
a toothed segment (5), and
a rocker lever (6) mounted so as to be rotatable, about a rocker lever axis of rotation (12), by a drive plate (3) via the toothed segment (5), wherein the rocker lever (6) is connected to the valve tappet (9) by pushrods (8), the pushrods (8) being mounted rotatably in relation to the rocker lever (6) and the valve tappet (9), such that the pushrods (8) attach to the rocker lever (6) at respective points of the rocker lever (6) at equal spacings to the left and right of the valve tappet (9).

2. The valve (1) as claimed in claim 1, further comprising a preload device (13), wherein the valve tappet (9) is preloaded, by the preload device (13), counter to translational movement generated by the rocker lever (6) of the transmission device.

3. The valve (1) as claimed in claim 2, wherein the valve tappet (9) has a disk-shaped receiving device (17) for receiving the preload device (13), the receiving device extending from the valve tappet (9) in the radial direction, wherein the receiving device (17) has undercuts (18) for guiding through the pushrods (8).

4. The valve (1) as claimed in claim 2, wherein when no electric current is applied to the valve (1), the preload device (13) operates to place the valve in a closed position.

5. The valve (1) as claimed in claim 1, wherein the pushrods (8) are arranged radially offset from the central axis (16) of the valve tappet (9), wherein the pushrods (8) are arranged parallel to the central axis (16) of the valve tappet (9).

6. The valve (1) as claimed in claim 1, wherein the valve tappet (9) has first and second radial bearings (15), the first radial bearing (15) being arranged at the first end region of the valve tappet (9), and the second radial bearing (15) being arranged at the second end region of the valve tappet (9).

7. The valve (1) as claimed in claim 1, wherein the toothed segment (5) has an inner toothing and the drive plate (3) engages into the inner toothing, such that rotation of the rotatably mounted drive plate (3) causes a rotation of the rocker lever (6) about the rocker lever axis of rotation (12).

8. The valve (1) as claimed in claim 1, wherein each of the pushrods (8) has:
on both end regions thereof, a through bore, wherein the through bores extend parallel to the rocker lever axis of rotation (12), and
axis elements oriented parallel to the rocker lever axis of rotation (12), and guided through the through bores, wherein the pushrods (8) are rotatable around the respective axis elements and the axis elements are connected rotationally conjointly to the valve tappet (9) or the rocker lever (6).

9. The valve (1) as claimed in claim 1, wherein at least one selected from the group of: the rocker lever (6); the toothed segment (5); the drive plate (3); the pushrods (8); and the valve tappet (9) are made of plastic.

10. A valve (1) for opening up or closing off a flow path, the valve (1) comprising:
a valve disk (14);
a valve tappet (9) having: a central axis (16), a first end region adjacent to the valve disk (14), and a second end region facing away from the valve disk (14); and
a transmission device (5, 6) configured to convert a rotational movement into a translational movement, the transmission device (6) including:
a toothed segment (5), and
a rocker lever (6) mounted so as to be rotatable, about a rocker lever axis of rotation (12), by a drive plate (3) via the toothed segment (5), wherein the rocker lever (6) is connected to the valve tappet (9) by pushrods (8), the pushrods (8) being mounted rotatably in relation to the rocker lever (6) and the valve tappet (9),
wherein the rocker lever (6) has two attachment regions (7) for attaching in each case one pushrod (8), wherein the rocker lever (6) has a cutout through which the valve tappet (9) extends, and wherein the attachment regions (7) are arranged on the right and left of the valve tappet (9) in the radial direction.

* * * * *